Jan. 21, 1930.  H. L. MORROW  1,744,660
MOTION PICTURE DEVICE
Filed June 5, 1926
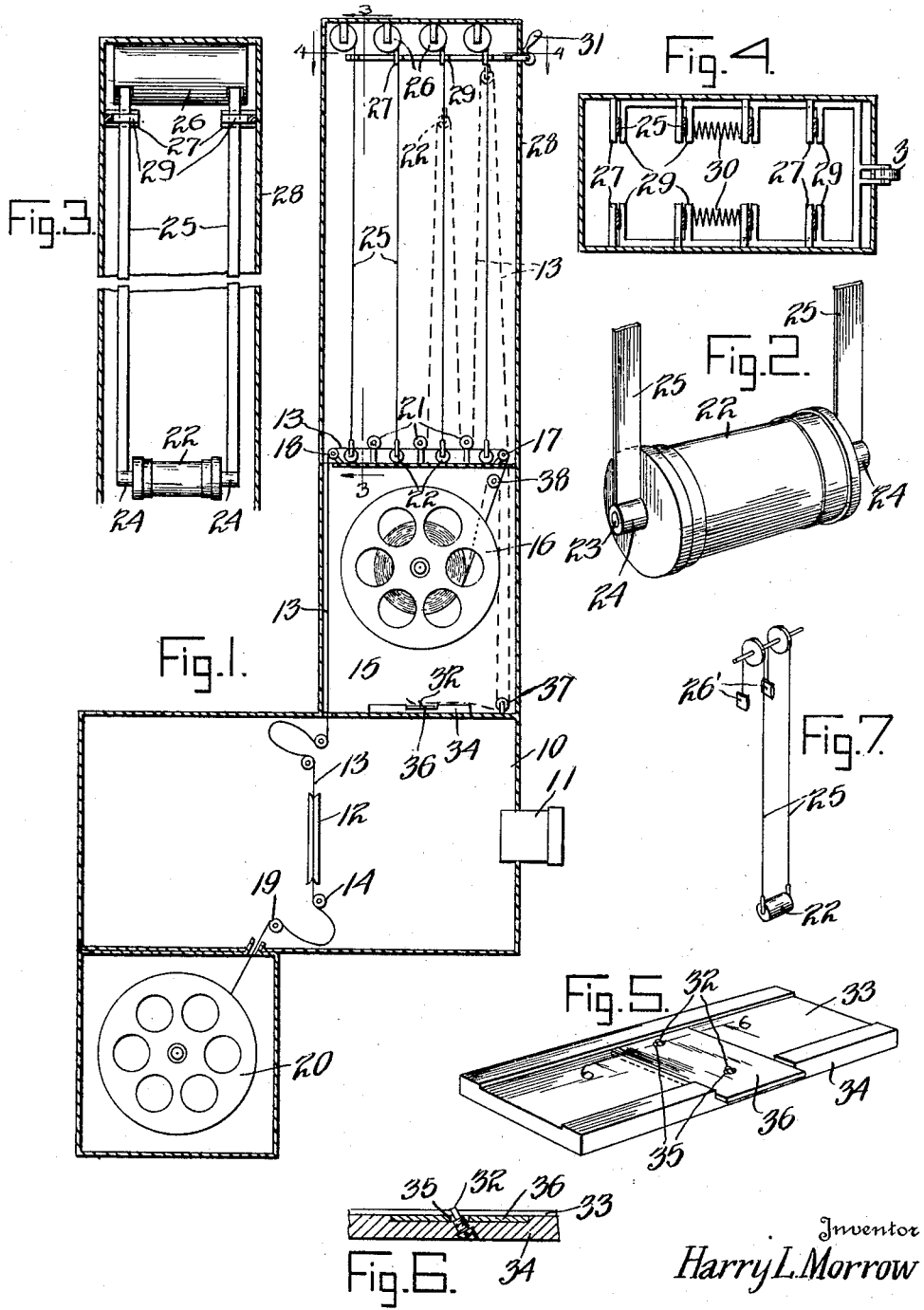
Inventor
Harry L. Morrow
By
Attorney Patented Jan. 21, 1930

1,744,660

UNITED STATES PATENT OFFICE

HARRY L. MORROW, OF GRAND VALLEY, COLORADO, ASSIGNOR OF ONE-FOURTH TO FRED H. MILLER, OF GRAND VALLEY, COLORADO

MOTION-PICTURE DEVICE

Application filed June 5, 1926. Serial No. 114,023.

My invention relates to an attachment for moving picture projectors whereby the operator is afforded ample time during the exposure of one film to splice the end of a new film to the one which is about to run off of the reel, thereby eliminating the necessity of operating two projecting machines as is now often done. An object of the invention is to provide a device whereby several feet of film may be pulled from the delivery reel at a much greater speed than required for projecting so that the final end of the film may be held stationery by the operator during the operation of splicing the leading end of the next film thereto. Another object is to keep the film under a slight tension at all times during the splicing operation. Another object being to provide a rapid and positive means for aligning the ends of the film at the point of splicing.

Referring to the accompanying drawings which are made a part hereof and on which similar reference characters indicate similar parts, Figure 1 is a vertical section through a projecting camera showing my improvement applied thereto.

Figure 2 is a detailed perspective of one of the take up rollers.

Figure 3 is a vertical section on line 3—3 of Figure 1.

Figure 4 a horizontal section on line 4—4 of Figure 1.

Figure 5 a detailed perspective of the alining device and

Figure 6 a detailed section on the line 6—6 of Figure 5.

Figure 7 a detail perspective of a modified form of counterbalance.

In the drawings the numeral 10 denotes a diagrammatic showing of a projecting camera comprising a lens 11, a framing device 12 through which passes the film 13 operated by the customary intermittent roller 14. A magazine 15 is mounted upon the top of a camera and encloses the delivery reel 16 from which the film 13 is being fed. The film passes through a slot in the top of the magazine and around a fixed idle roller 17, then across the top to a similar roller 18, then down through the magazine to the framing device and its associated parts. After leaving the intermittent roller the film passes over the customary idle roller 19 down to the take-up reel 20. Mounted on the top of the magazine 15 are also three guide rollers 21 beneath which the film passes.

When the film on the reel 16 has reached to within a few feet of the end, I desire to attach the beginning of the next film thereto. In order to accomplish this result while the machine is in operation I have provided means to rapidly pull the remaining portion of the film from the reel 16 without interfering with its delivery to the projecting device. I accomplish this by means of a series of rollers 22 positioned below that portion of the film which passes beneath the rollers 21 in the following manner. Each of the rollers 22 is mounted on a shaft 23 journalled in bearings 24 supported upon the ends of thin metal straps 25 which are at their upper ends wound upon spring rollers 26, or any suitable counterbalancing means, which have a tendency to pull the rollers 22 upward. During the operation of the camera I desire the rollers 22 to be in their lowermost position, so as to offer practically no resistance to the movement of the film. I therefore provide clutches comprising a stationary member 27 fixed to a casing 28 from which the rollers 26 are hung. A movable clutch member 29 is slidably mounted in the casing and adapted to bear against the straps 25 firmly pressing them against the stationary clutch member 27 by means of a compression spring 30. The clutch members 27 and 29 are held apart when necessary by means of a cam shaped lever 31 located on the front of the casing.

When it is desired to splice the new film to the one being projected, the clutch handle 31 is rotated the cam portion of the handle separates the clutch members 29 from the straps 25 allowing the spring rollers 26 or counterbalance means to raise the rollers 22, thereby lifting the film into a series of long loops. The operator then takes the film and passes it around the rollers 37 and 38 and waits until the end of the film leaves the reel 16. The end of the film then passes from the roller 37 and is fastened to a pair of inclined pins 32 fixed in a channel 33 formed in the upper surface of a block 34 mounted on the bottom of the magazine chamber 15. The pins 32 pass through openings 35 in a thin plate 36 which is set into the top of the block 34. The empty reel 16 is then removed and a full reel is placed in the machine. An adhesive is placed upon a leading end of the new film and this end is then aligned over the pins in a manner to overlap the end of the film which is being used. The operator then places one finger upon the top of the film lap and raises the plate 36 with his thumb and presses the films firmly together. During the time of the splicing the film has been feeding into the projecting machine at a given speed and the rollers 22 have been drawn down one at a time to their lowermost position at which they are secured by the clutch members 27 and 29 during the projecting of this film. Figure 7 shows a modified form of means for raising the rollers 22 in which I employ counter weights 26' instead of the spring rollers 26, as shown.

Having thus fully described my said invention, what I claim as new and desire to secure by Letters Patent, is:—

1. The combination of a moving picture projector comprising a delivery reel, the intermittent film advancing device and the take up reel, with yieldable means for pulling a quantity of film from said delivery reel at a greater speed than said film advancing device, said means comprising a series of spaced fixed rollers mounted above a portion of said film, a series of spaced movable rollers mounted between said fixed rollers and below said portion of film, clutches for holding said movable rollers in their lowermost position when not in use, means for simultaneously releasing said clutches, and means for temporarily holding and aligning the free end of said films during the operation of said projector for splicing the new film thereto, substantially as set forth.

2. A casing, two sets of rollers for guiding a film across the casing, one set of rollers being movable between the other set of rollers for forming loops in the film, and adjustable supporting means for said movable set of rollers, comprising spring rollers fixed in the top of the casing, flexible bands carried by said spring rollers and supporting the movable rollers whereby upon rotation of the spring rollers the movable rollers will be raised or lowered; substantially as set forth.

3. A casing, two sets of rollers for guiding a film across the casing, one set of rollers being movable between the other set of rollers for forming loops in the film, and adjustable supporting means for said movable set of rollers, comprising spring rollers fixed in the top of the casing, flexible bands carried by said spring rollers and supporting the movable rollers whereby upon rotation of the spring rollers the movable rollers will be raised or lowered, fixed abutments adjacent said flexible bands and movable abutments adjacent said flexible abutments and operable for clamping the flexible bands against the movable abutments for securing the movable rollers at a definite elevation, substantially as set forth.

4. In a moving picture projector, a delivery reel, intermittent film advancing means, a take-up reel, means between the delivery reel and the film advancing means for pulling a quantity of film from the delivery reel at a greater speed than the film advancing device comprising a series of spaced rollers mounted above a portion of the film, a series of spaced rollers mounted below said portion of the film, a plurality of spring rollers fixed in the top of the casing for moving apart and tending to hold the two series of rollers apart whereby the film will be caused to travel in a tortuous path from the delivery reel to the film advancing means, and means for maintaining the resilient means in inoperative position to permit the film to be drawn directly from the delivery reel by the advancing device, substantially as set forth.

In witness whereof, I have hereunto set my hand at Washington, District of Columbia, this 3d day of June, A. D. nineteen hundred and twenty-six.

HARRY L. MORROW.